US012579599B2

(12) United States Patent
 Allen et al.

(10) Patent No.: US 12,579,599 B2
(45) Date of Patent: Mar. 17, 2026

(54) X-RAY IMAGING DEVICE WITH A RECONFIGURABLE IMAGE PROCESSING MODULE

(71) Applicant: Varex Imaging Corporation, Salt Lake City, UT (US)

(72) Inventors: Maxwell J. Allen, Redwood City, CA (US); Mihir Shah, San Jose, CA (US); Carlo Tognina, Salt Lake City, UT (US)

(73) Assignee: VAREX IMAGING CORPORATION, Salt Lake City, UT (US)

( * ) Notice: Subject to any disclaimer, the term of this patent is extended or adjusted under 35 U.S.C. 154(b) by 347 days.

(21) Appl. No.: 18/320,965

(22) Filed: May 19, 2023

(65) Prior Publication Data

US 2024/0386522 A1     Nov. 21, 2024

(51) Int. Cl.
*G06T 1/20* (2006.01)
*G01T 1/17* (2006.01)
*G06T 5/00* (2024.01)

(52) U.S. Cl.
CPC .................. *G06T 1/20* (2013.01); *G01T 1/17* (2013.01); *G06T 5/00* (2013.01); *G06T 2207/10116* (2013.01)

(58) Field of Classification Search
None
See application file for complete search history.

(56) References Cited

U.S. PATENT DOCUMENTS

| | | | |
|---|---|---|---|
| 8,415,974 B1 | 4/2013 | Lysaght | |
| 10,031,993 B1 | 7/2018 | Poornachandran et al. | |
| 2012/0250819 A1* | 10/2012 | Yoshida | A61B 6/5258 |
| | | | 250/366 |
| 2013/0336452 A1 | 12/2013 | Matsuda et al. | |
| 2016/0321081 A1 | 11/2016 | Kim et al. | |
| 2020/0410666 A1* | 12/2020 | Wagner | A61B 34/20 |
| 2024/0255655 A1* | 8/2024 | Wilson | A61B 6/4411 |

OTHER PUBLICATIONS

PCT/US2024/030042 International Search Report and Written Opinion dated Sep. 23, 2024. 9 pages.

* cited by examiner

*Primary Examiner* — Dov Popovici
(74) *Attorney, Agent, or Firm* — Dorsey & Whitney LLP

(57) ABSTRACT

Some embodiments include an x-ray imaging device, comprising: a sensor array configured to convert incident x-rays into electrical signals; a memory configured to store a static configuration data; a processor; a programmable logic device; and a communication interface; wherein: the processor is configured to apply the static configuration data to the programmable logic device; when configured with the static configuration data, the programmable logic device is configured with: a static image processing module; and a reconfigurable image processing module; and the static image processing module and the reconfigurable image processing module are part of an image processing pipeline configured to receive the electrical signals and output an image.

20 Claims, 7 Drawing Sheets

PLD 104

| Device Info. 132 |

| PLD Interface 106 | Header Module 130 | Static Image Processing Module 108 | Reconfigurable Image Processing Module 110 | Comm. Interface 112 |

Temp. Sensor 120

Gyroscope 122

Clock 124

PLD 104

Device Info. 132

PLD Interface 106

Header Module 130

Static Image Processing Module 108

Reconfigurable Image Processing Module 110

Comm. Interface 112

FIG. 8

804 — Apply static configuration data to a programmable logic device

808 — Apply dynamic configuration data to the programmable logic device to replace the reconfigurable image processing module 812 — Convert incident x-rays into the electrical signals with a sensor array 816 — Process the electrical signals with an image processing pipeline configured to receive electrical signals and output an image

FIG. 9

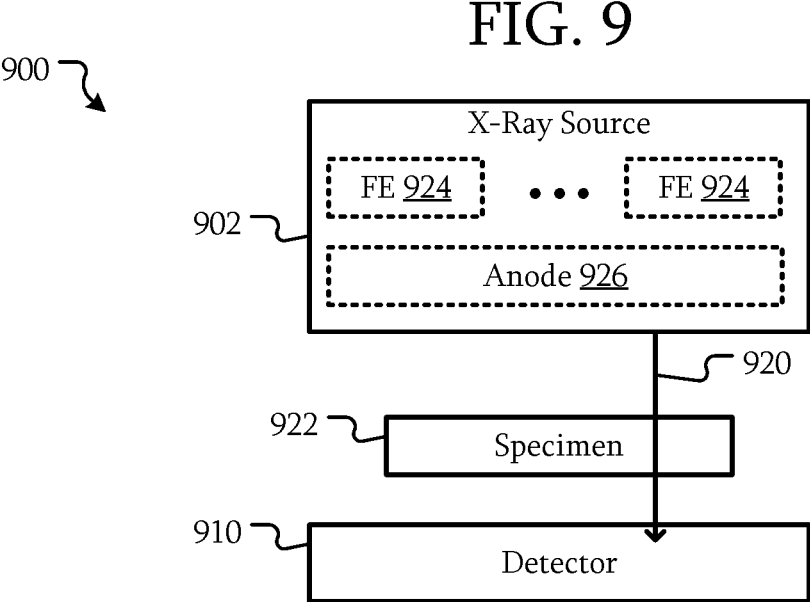

900

X-Ray Source

902

FE 924  • • •  FE 924

Anode 926

920

922 — Specimen

910 — Detector

X-RAY IMAGING DEVICE WITH A RECONFIGURABLE IMAGE PROCESSING MODULE

X-ray imaging devices may be used to generate images or video in response to incident x-rays. Various forms of image processing may be performed on the digitized data generated in response to a sensor array. Original equipment manufacturers (OEMs) using the x-ray imaging devices may perform custom image processing on outputs of the x-ray imaging devices.

BRIEF DESCRIPTION OF SEVERAL VIEWS OF THE DRAWINGS

FIG. 1 is a block diagram of an x-ray imaging device with a programmable logic device (PLD) including a reconfigurable image processing module according to some embodiments.

FIG. 8 is a flowchart of a technique of operating an x-ray imaging device with a programmable logic device including a reconfigurable image processing module according to some embodiments.

FIG. 9 is a block diagram of an x-ray imaging system according to some embodiments.

DETAILED DESCRIPTION

Some embodiments include an x-ray imaging device with a programmable logic device (PLD) including a reconfigurable image processing module. Original equipment manufacturers (OEMs) may develop proprietary image processing operations. These operations may be performed on a computer after receiving image data from an x-ray imaging device. The operations may be moved into the x-ray imaging device; however, the OEM must disclose the proprietary operation to the manufacturer of the x-ray imaging device. Such sharing may be undesirable for the OEM.

As will be described in further detail below, in some embodiments, an x-ray imaging device may be configured to use a reconfigurable image processing module. The reconfigurable image processing module may be reconfigured with dynamic configuration data from the OEM related to the proprietary image processing operation. Thus, the x-ray imaging device may perform the proprietary image processing operation. Performing the proprietary image processing operations on the programmable logic device may provide greater cost efficiencies and/or a more robust overall system design over using a multi-purpose computer (e.g., a host system) external to the x-ray imaging device as computational operations can be performed on dedicated hardware and software for image processing within the x-ray imaging device. Requirements for computational bandwidth (such as processing power, memory bandwidth, etc.) may be quite significant for a computer system which needs to run real time image processing algorithms. Embodiments described herein may have significant built in processing power. Image processing steps may be migrated from a dedicated computer into the x-ray detector with little to no additional cost to the OEM. This may allow the OEM to save cost by reducing requirements on a multipurpose computer or it might eliminate the need for one altogether. Furthermore, ongoing maintenance cost and software update risks inherent with a multipurpose computer can be reduced or avoided.

In addition, by using the programmable logic device, some proprietary image processing operations may be performed prior to standard image processing operations provided by the x-ray imaging device, which allows the OEM greater control over image processing operations and the order of those operations. In addition, an amount of work by the OEM may be reduced as the integration of the image processing operations are moved to the x-ray imaging device. In some embodiments, the dynamic configuration data may be encrypted such that the internal operations of the reconfigured reconfigurable image processing module are not required to be disclosed to an x-ray imaging device manufacturer or designer of embedded software.

Figure 1:
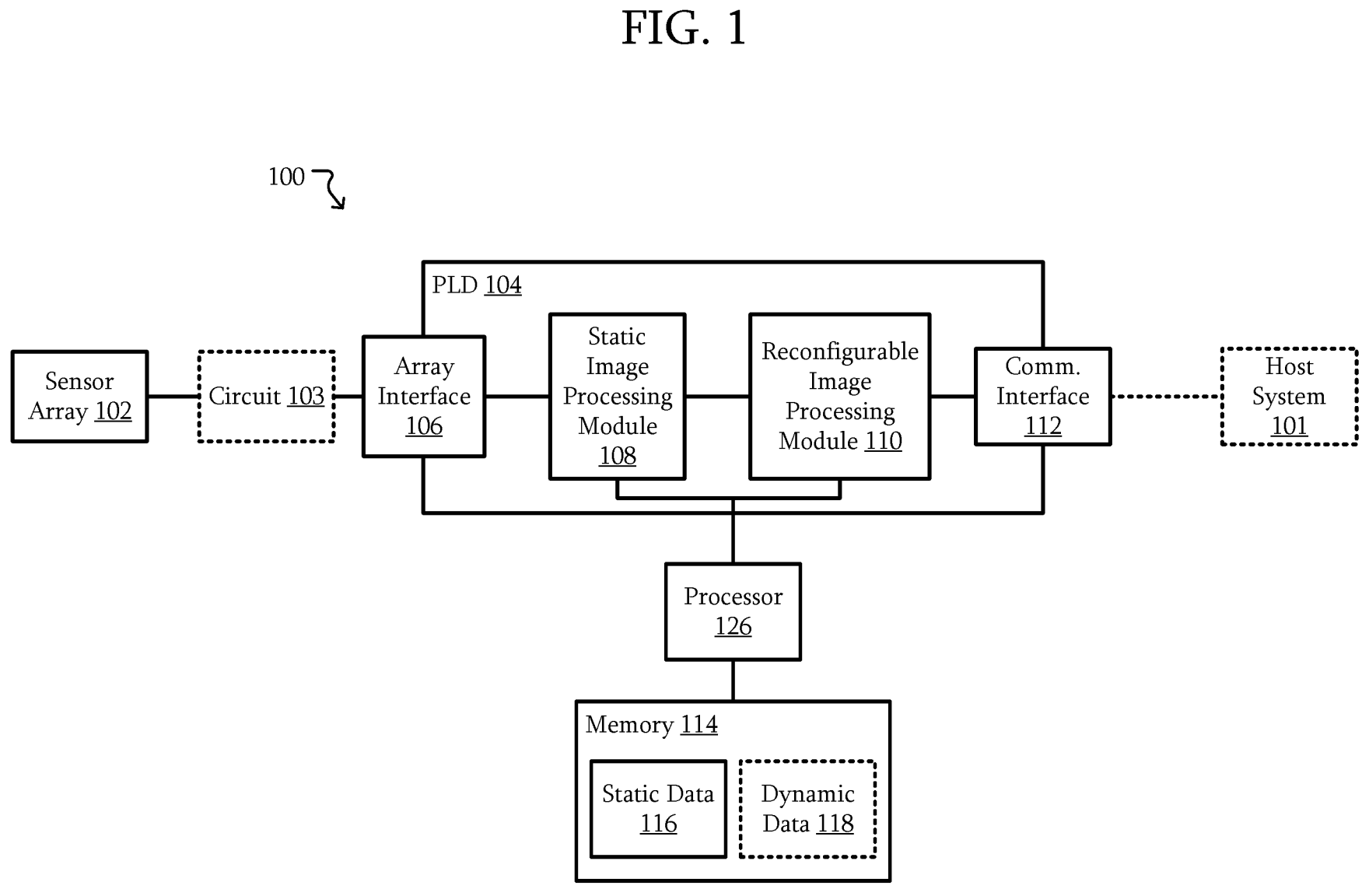
Figure 2A:
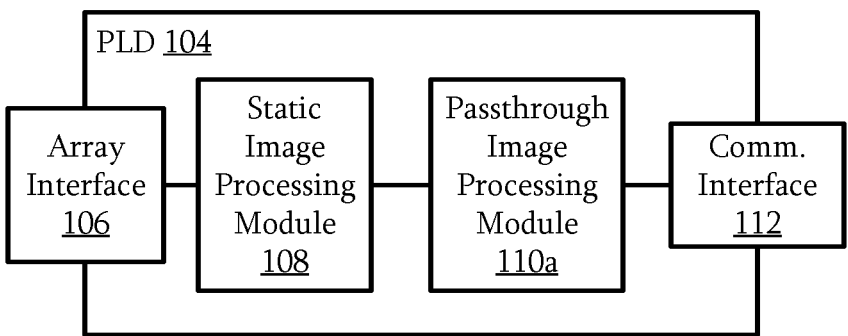
FIGS. 2A and 2B are block diagrams of the x-ray imaging device of FIG. 1 with different configurations of the reconfigurable image processing module according to some embodiments.
Figure 2B:
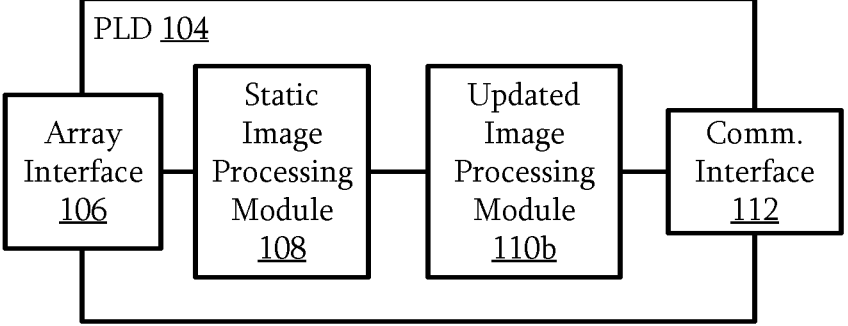

FIG. 1 is a block diagram of an x-ray imaging device with a programmable logic device including a reconfigurable image processing module according to some embodiments. FIGS. 2A and 2B are block diagrams of the x-ray imaging device of FIG. 1 with different configurations of the reconfigurable image processing module according to some embodiments. Referring to FIGS. 1-2B, in some embodiments, the x-ray imaging device 100 includes a sensor array 102, a programmable logic device (PLD) 104, a processor 126, and a memory 114.

The sensor array 102 may be configured to convert incident x-rays into electrical signals. The sensor array 102 includes an array of pixels or sensors that are configured to convert x-rays, light, or other photons into an electrical signal, such as a charge or voltage. A scintillator, direct conversion material, or other x-ray conversion material may be part of the sensor array 102 and configured to convert incident x-rays into photons that the sensors may convert into electrical signals. For example, a scintillator may include a variety of materials configured to convert x-ray photons into photons detectable by the sensors such as cesium iodide (CsI), cadmium tungstate (CdWO4), polyvinyl toluene (PVT), gadolinium oxysulfide (Gd2O2S; GOS; Gadox), gadolinium oxysulfide doped with terbium (Gd202S:Tb), or the like. Examples of direct conversion materials include cadmium telluride (CdTe), cadmium zinc telluride (CdZnTe or CZT), mercury iodide (HgI), lead iodide (PbI), selenium, or the like.

The programmable logic device 104 may include a device such as a field-programmable gate array (FPGA)), programmable array logic (PAL), multiprocessor system on chip (MPSoC), or the like. The programmable logic device 104 may include any device where the hardware may be reconfigured by applying different configuration data.

The memory 114 may include a dynamic random access memory (DRAM), a double data rate synchronous dynamic random access memory (DDR SDRAM) according to various standards such as DDR, DDR2, DDR3, DDR4, static random access memory (SRAM), non-volatile (NV) memory such as any suitable non-transitory, persistent, and/or NV storage resource, including, but not limited to a non-transitory storage device, a persistent storage device, an internal storage device, an external storage device, a remote storage device, Network Attached Storage (NAS) resources, a magnetic disk drive, a hard disk drive (HDD), a solid-state storage device (SSD), a Flash memory device, and/or the like.

The memory 114 is configured to store static configuration data 116. The static configuration data includes data that when used to configure the programmable logic device 104, configures the programmable logic device 104 to include at least a static image processing module 108 and a reconfigurable image processing module 110 (labeled as dynamic image processing module). The static image processing module 108 and the reconfigurable image processing module 110 are part of an image processing pipeline configured to receive the electrical signals and output an image extending from the array interface 106 to the communication interface 112. The reconfigurable image processing module 110 may also be referred to as reconfigurable logic. The static image processing module 108 may also be referred to as static logic.

The array interface 106 of the programmable logic device 104 includes inputs and optionally outputs configured to receive image data generated in response to the sensor array 102. For example, the image data received by the array interface 106 may be a stream of data representing a frame, multiple frames, video, or the like generated in response to the sensor array 102. A circuit 103 may be disposed between the sensor array 102 and the array interface. The circuit 103 may be configured to perform various pre-processing operations such as digitizing analog data, serializing digitized data, or the like to prepare the image data to be in the format expected by the programmable logic device 104. The circuit 103 may include application specific integrated circuits (ASICs), analog to digital converters (ADCs), or the like.

The processor 126 may include a general purpose processor, a digital signal processor (DSP), an application specific integrated circuit (ASIC), a microcontroller, a programmable logic device (e.g., field-programmable gate array (FPGA)), discrete circuits, a combination of such devices, or the like. The processor 126 may include external interfaces, such as address and data bus interfaces, interrupt interfaces, or the like. The control logic 104 may include other interface devices, such as logic chipsets, hubs, memory controllers, communication interfaces, or the like to connect the processor 126 to internal and external components, the programmable logic device 104, the memory 114, or the like.

The communication interface 112 may include any communication interface, such as WiFi, Ethernet, CoaXPress (CXP) zigbee, infrared, Z-wave, Bluetooth, near field communications (NFC), or the like. The communication interface 112 represents both portions of the programmable logic device 104 and other components of the x-ray imaging device 100 to allow the x-ray imaging device 100 to communicate the processed image data.

The processor 126 may be configured to apply the static configuration data 116 to the programmable logic device 104. When configured with the static configuration data 116, the programmable logic device 104 is configured with the static image processing module 108 and the reconfigurable image processing module 110. The static image processing module 108 and the reconfigurable image processing module 110 are part of an image processing pipeline configured to receive the electrical signals through the array interface 106 and output an image through the communication interface 112.

FIG. 2A illustrates a state of the programmable logic device 104 when the programmable logic device 104 has been configured with the static configuration data 116. The static configuration data 116 may include data to configure the entirety of the programmable logic device 104. For example, the static configuration data 116 may be stored as a full binary file (e.g., .bit file) to configure the static image processing module 108 and the reconfigurable image processing module 110 of the programmable logic device 104. In particular, the configuration of the reconfigurable image processing module 110 based on the static configuration data 116 includes a passthrough image processing module 110a as the reconfigurable image processing module 110. The reconfigurable image processing module 110 configured by the static configuration data 116 as the passthrough image processing module 110a may be configured to receive the image data and output the image data without modification. The effect of the passthrough image processing module 110a may be to only delay the image data due to inherent processing time to comply with input and output protocols.

FIG. 2B illustrates a state of the programmable logic device 104 when the programmable logic device 104 has been configured with the static configuration data 116 and configured with the dynamic configuration data 118. The dynamic configuration data 118 may include data to reconfigure less than all of the programmable logic device 104, such as reconfiguring only the reconfigurable image processing module or modules 110. For example, the dynamic configuration data 118 may be stored as a partial binary file (e.g., .bit file) to configure at least one reconfigurable image processing module 110 of the programmable logic device 104. The partial binary file of the dynamic configuration data 118 may have a smaller file size than the full binary file of the static configuration data 116. The presence of the full binary file and the partial binary file for configuring the programmable logic device 104 may indicate the presence of dynamic configuration data 118 or the use of reconfigurable image processing module 110. In another embodiment, the application, configuring, or programing of the programmable logic device 104 with the partial binary file may indicate the use of reconfigurable image processing module 110. The dynamic configuration data includes data that may be used to configure the reconfigurable image processing module 110 such that it operates as the updated image processing module 110b. The updated image processing module 110b may be configured to process the image data in a manner different from passing the data as the passthrough image processing module 110a.

In some embodiments, the x-ray imaging device 100 is coupled to a host system 101, such as a computer. The x-ray imaging device 100 may be configured to communicate with the host system 101 through the communication interface 112. In particular, the x-ray imaging device 100 may be configured to transmit the processed image data to the host system 101.

In some embodiments, the static image processing module 108 may be configured to perform a variety of operations specific to the sensor array 102 and the x-ray imaging device 100. For example, the static image processing module 108 configured to perform at least one of offset correction, gain correction, scatter correction, grid suppression, defective pixel correction, or the like on the image data based on the sensor array 102. Offset correction may include subtracting a frame rate and/or temperature dependent offset level on a pixel by pixel basis to deliver an image with a zero or fixed average value when no x-ray dose is delivered. Gain correction may include correcting for variations in the pixel-to-pixel sensitivity of the detector to create a uniform image for an unattenuated x-ray beam. Scattered x-ray photons may have a negative impact on image quality as the scattered x-ray photons reduce image contrast and can lead to different image artifacts. Scatter correction reduces image artifacts and improves contrast by estimating and correcting the contribution of scatter x-rays to the image. A hardware grid may cause a fixed pattern artifact in images. Grid suppression may reduce or eliminate this fixed pattern. Defective pixel correction may include replacing the non-valid pixel information in an image caused by a defective pixel with an interpolated value calculated using the defective pixel's valid neighbors. While several image processing operations have been used as examples, in other embodiments, the image processing operations may include other operations.

In some embodiments, the array interface 106 within the programmable logic device 104, the static image processing module 108, the reconfigurable image processing module 110 may be configured to communicate using a standardized interface. For example, communications within the programmable logic device 104 may use the Advanced extensible Interface (AXI). However, in other embodiments, the internal communications may be performed according to another standardized interface, a proprietary interface, or the like.

The reconfigurable image processing module 110 when configured with a passthrough configuration as the passthrough image processing module 110a or with the dynamic configuration data 118 as the updated image processing module 110b presents the same input and output interfaces. Accordingly, other components of the image pipeline may remain the same. In particular, the other components defined by the static configuration data 116 may not be reconfigurable and may expect any other modules to operate the same way with respect to the input and output of data even if the reconfigurable image processing module 110 is configured to not operate in a passthrough configuration.

In some embodiments, an OEM may be provided with a framework to generate the dynamic configuration data 118. The interface may be defined such that the OEM is aware of expected inputs and outputs. In addition, the OEM may be provided with the format of the content provided as an input. For example, as will be described in further detail below, the content transferred between the static image processing module 108 and the reconfigurable image processing module 110 may include a header with image data formatted in a particular manner. With this information, the OEM may generate the dynamic configuration data 118 such that it will be a drop in replacement for the passthrough image processing module 110a.

In some embodiments, a manufacturer of the x-ray imaging device 100 need not be aware of the content of the dynamic configuration data 118 or the function provided by the reconfigurable image processing module 110 when the programmable logic device 104 is configured with the dynamic configuration data 118. For example, an OEM may have a proprietary image processing operation. The OEM may define that proprietary image processing operation in the dynamic configuration data 118. The dynamic configuration data 118 may be encrypted such that examination of the dynamic configuration data 118 may not reveal the operations. The OEM no longer needs to disclose to the manufacturer of the x-ray imaging device 100 the desired operations that now may be implemented in the reconfigurable image processing module 110. For example, the OEM may have a desired finite impulse response (FIR) filter intended to filter the image data. Previously, the OEM would need to provide the manufacturer the details of the FIR filter, such as coefficients, configuration or the like, so the manufacturer may implement the FIR filter. With embodiments described herein, the OEM may independently define the dynamic configuration data 118 and provide that dynamic configuration data 118 to the manufacturer without disclosing details of the FIR filter. Moreover, the design of that filter may be generated by the OEM and not the manufacturer. The design may not integrated with the remainder of the static configuration data 116. In another example, the OEM may have specific information related to a grid, the geometry, or the like that may be unique to the OEM's system. The proprietary image processing operation may include grid suppression specific to the OEM's specific grid to reduce or eliminate artifacts or patterns due to the OEM's grid. In another example, the OEM may have a particular scatter correction operation tuned to their specific application and/or geometry, particularly if the OEM's system does not use a grid. In another example, the proprietary image processing may include de-noising to improve low dose imaging. Trade-offs between de-noising and its impact to spatial or temporal resolution might be unique to the OEM's application. In another example, existing infrastructure for transfer of data from the x-ray imaging device 100 might only support limited data rates, such as 1 gigabits per second (Gb/s) or less. Proprietary image compression may enable new x-ray imaging devices 100 to be used with existing infrastructure but still provide an good or improved image quality.

In some embodiments, the dynamic configuration data 118 may be in an encrypted format. The encrypted format may allow for the operations to be protected from disclosure to the manufacturer. For example, an OEM may generate the dynamic configuration data 118 in a binary file that is encrypted. That binary file may be provided to the manufacturer. The programmable logic device 104 may be configured to apply the encrypted dynamic configuration data 118 such that the associated updated image processing module 110b replaces the passthrough image processing module 110a to perform the operations defined by the OEM.

In some embodiments, available resources in the programmable logic device 104 may be limited. An OEM may be provided with a limit to the available resources, the size of a particular block of the programmable logic device 104, a particular p-region, or the like. The OEM may then prepare the dynamic configuration data 118 to implement a desired operation within those limits. The passthrough image processing module 110a may cover the same resources, size, regions, or the like such that the updated image processing module 110b is a drop in replacement.

In some embodiments the static configuration data 116 and the dynamic configuration data 118 may be created by different programming languages. For example, the manufacturer may generate the static configuration data 116 using a source written in a first hardware description language (HDL) while the source for the dynamic configuration data 118 may be written in a different HDL.

In some embodiments, an updated image processing module 110b may be replaced with a different updated image processing module 110*b* using different dynamic configuration data 118. For example, during testing a variety of image processing techniques may be implemented in different sets of dynamic configuration data 118. Each of the different sets of dynamic configuration data 118 may be loaded into the memory 114, applied to the programmable logic device 104 to reconfigure the reconfigurable image processing module 110, and tested in the image pipeline.

In some embodiments, the x-ray imaging device 100 may be manufactured and shipped to an OEM without any dynamic configuration data 118. The OEM may install the dynamic configuration data 118 as desired. The dynamic configuration data 118 may also be updated in the field. The static configuration data 116 may remain the same.

In some embodiments, the processor 126 may be configured to apply the dynamic configuration data 118 to the programmable logic device 104 on powerup. For example, the processor 126 may be configured to first apply the static configuration data 116 and then apply the dynamic configuration data 118. The application of the dynamic configuration data 118 may occur on powerup as well or after the x-ray imaging device 100 has started operating.

In some embodiments, the use of the reconfigurable image processing module 110 may reduce resources and/or computations required on the host system 101. Image processing operations and the associated resources of the host system 101 may be performed by the reconfigurable image processing module 110 within the x-ray imaging device 100. Thus, the host system 101 may be less complex.

In some embodiment, the dynamic configuration data 118 may be stored in one or more files separate from any files of the static configuration data 116. The one or more files of the dynamic configuration data 118 may be stored in a separate partition of the memory 114.

Figures 3, 4:
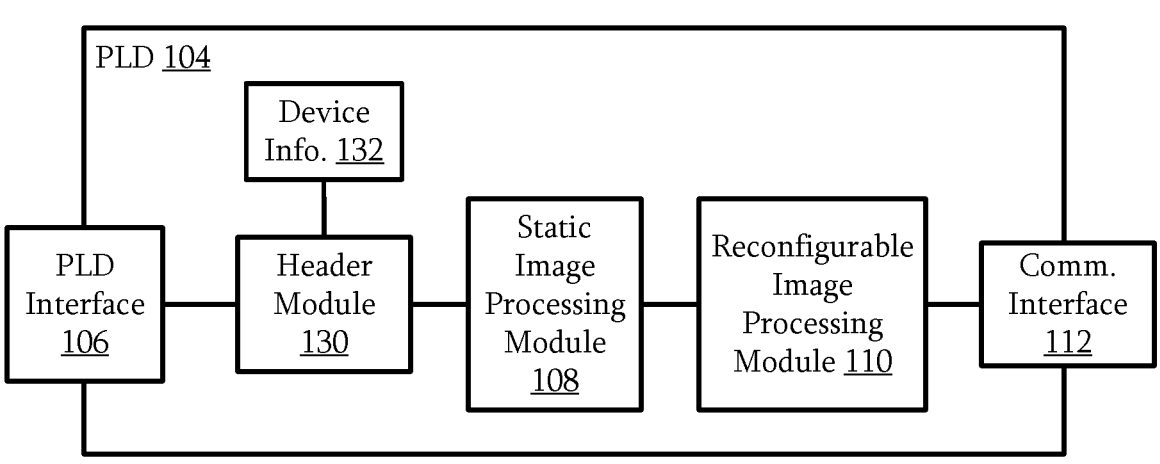
FIG. 3 is a block diagram of an x-ray imaging device with a programmable logic device including a reconfigurable image processing module and a header module according to some embodiments.
FIG. 4 is a block diagram of an x-ray imaging device with a programmable logic device including a reconfigurable image processing module and a header module, and examples of sensors according to some embodiments.

FIG. 3 is a block diagram of an x-ray imaging device with a programmable logic device including a reconfigurable image processing module and a header module according to some embodiments. In some embodiments the programmable logic device 104 may include a header module 130 to generate a header. The header module 130 may be defined by the static configuration data 116 such that when the programmable logic device 104 is configured with the static configuration data 116, the programmable logic device 104 is configured with the header module 130.

The header module 130 is part of the image processing pipeline. The header module 130 may be configured to add device information 132 to the image processing pipeline such that the device information 132 is available to one or more modules. For example, the header module 130 may be configured to add data to the image processing pipeline, replace data within the image processing pipeline, or the like such that the device information 132 is available to later modules such as the static image processing module 108, the reconfigurable image processing module 110, or the like.

In some embodiments, the device information 132 includes any information related to the x-ray imaging device 100, the ambient or environmental conditions, related systems such as information related to an x-ray source, or the like. In some embodiments, the device information 132 includes any such information that may have an effect on an image generated based on the sensor array 102.

FIG. 4 is a block diagram of an x-ray imaging device with a programmable logic device including a reconfigurable image processing module and a header module, and examples of sensors according to some embodiments. In some embodiments, the x-ray imaging device 100 may include various sensors or other circuits configured to provide device information 132. Three examples of sensors or circuits are illustrated and include a temperature sensor 120, a gyroscope 122, and a clock 124. However, in other embodiments, different sensors, circuits, or the like may be included that may generate information for the device information 132.

In a particular example, the temperature sensor 120 may be configured to generate temperature information. The temperature sensor 120 may be coupled to the programmable logic device 104 such that the temperature information is available as part of the device information 132. The temperature information may be added to a header by the header module 130. Accordingly, the temperature information may be available to the downstream modules in the image processing pipeline such as the static image processing module 108, the reconfigurable image processing module 110, or the like.

In a particular example, the reconfigurable image processing module 110 may be configured to use the temperature information from the temperature sensor 120. The reconfigurable image processing module 110 may be configured to perform temperature dependent gain correction on the image data. While temperature dependent gain correction has been used as an example, other temperature dependent operations may be performed by the reconfigurable image processing module 110 based on the dynamic configuration data 118.

Although temperature information from the temperature sensor 120 has been used as an example, in other embodiments, other sensors, devices or the like may be sources of the device information 132 that may be added to the image processing pipeline through the header module 130. Although a gyroscope 122 and a clock 124 are illustrated as examples, the sources of the information may be different from or in addition to information from the gyroscope 122 and/or the clock 124.

Figure 5:
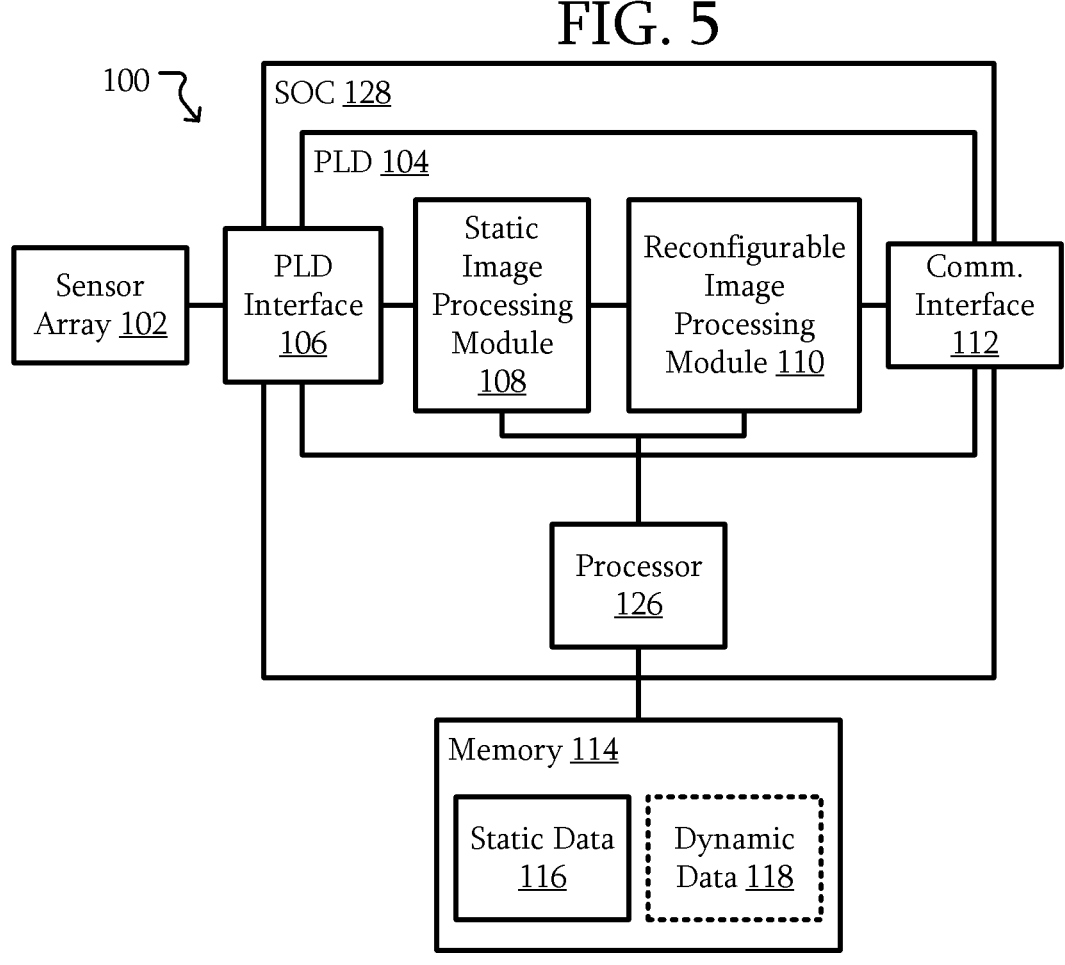
FIG. 5 is a block diagram of an x-ray imaging device with a system-on-chip (SoC) including a programmable logic device including a reconfigurable image processing module according to some embodiments.

FIG. 5 is a block diagram of an x-ray imaging device with a system-on-chip including a programmable logic device including a reconfigurable image processing module according to some embodiments. The x-ray imaging device 100 may be similar to the x-ray imaging device 100 of FIG. 1, as described above. In some embodiments, the x-ray imaging device 100 includes a system-on-chip (SOC) 128. The SOC 128 may include the processor 126 and the programmable logic device 104.

The SOC 128 may be configured to use the processor 126 to read the dynamic configuration data 118 from the memory 114. The processor 126 is configured to reconfigure the programmable logic device 104 with the dynamic configuration data 118 to replace the reconfigurable image processing module 110 as described above.

Figure 6:
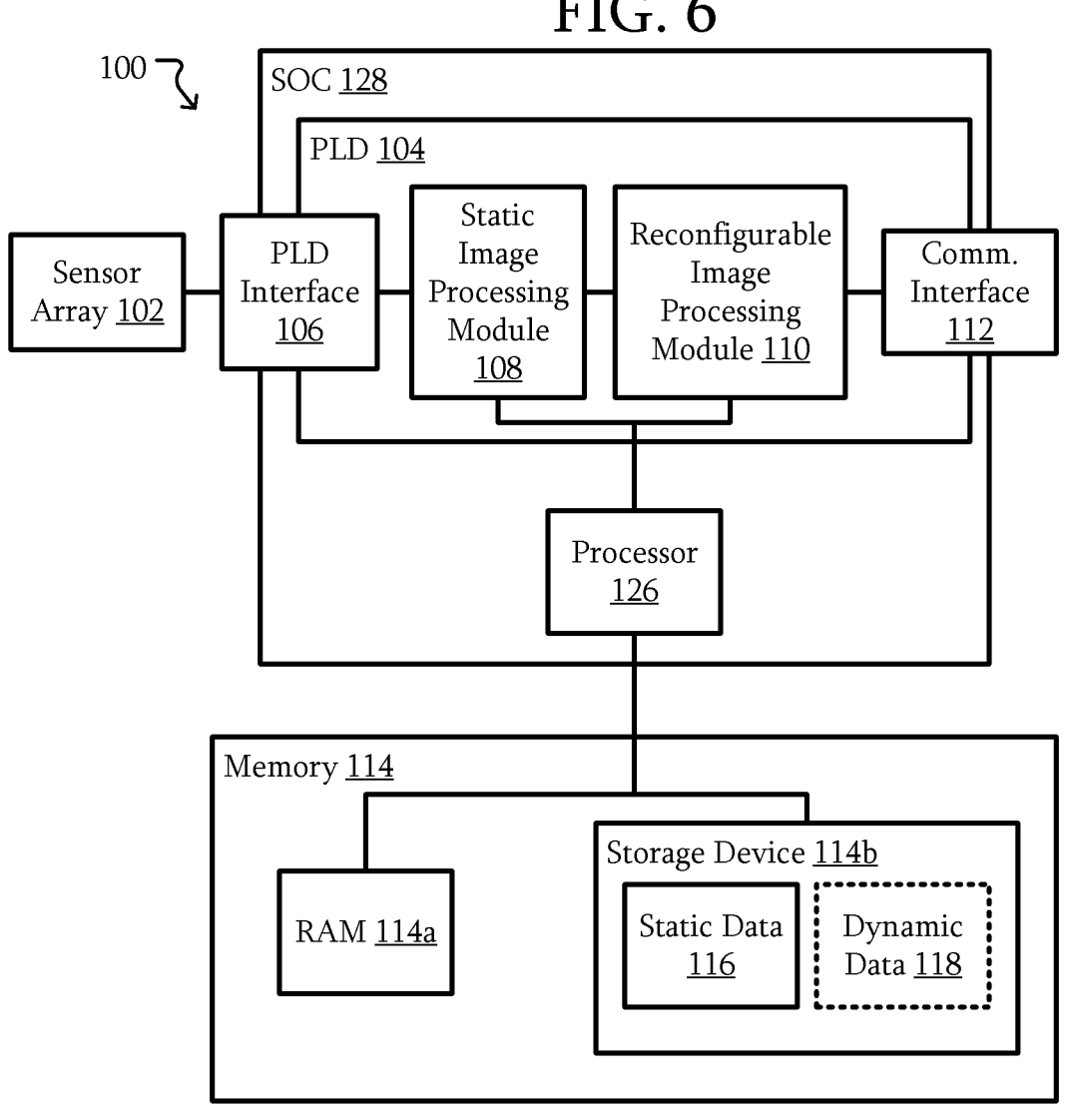
FIG. 6 is a block diagram of an x-ray imaging device with a system-on-chip including a programmable logic device including a reconfigurable image processing module and a random access memory according to some embodiments.

FIG. 6 is a block diagram of an x-ray imaging device with a system-on-chip including a programmable logic device including a reconfigurable image processing module and a random access memory according to some embodiments. The x-ray imaging device 100 may be similar to the x-ray imaging device 100 described above with reference to FIGS. 1-5. In some embodiments, the memory 114 includes both random access memory (RAM) 114*a* and a storage device 114*b*. The RAM 114*a* may be coupled to the programmable logic device 104. In this example, the RAM 114*a* is coupled to the programmable logic device 104 through the processor 126; however, in other embodiments, the RAM 114*a* may be directly coupled with the programmable logic device 104, coupled through a different circuit, or the like. The static configuration data 116 and the dynamic configuration data 118 may be stored in the storage device 114*b*. In some embodiments, the RAM 114a includes a volatile memory device while the storage device 114b includes a non-volatile memory device. However, in other embodiments, the RAM 114a may include a non-volatile memory device.

When the programmable logic device 104 is configured with the static configuration data 116, the RAM 114a is accessible to the reconfigurable image processing module 110. As a result, the reconfigurable image processing module 110 may be configured to store intermediate data in the RAM 114a. In some embodiments, the reconfigurable image processing module 110 may be configured to operate across multiple rows, columns, frames, video segments, or the like over time. These spans of image data may exceed the size of a single block of image data, may be separated in time, or the like. The use of the RAM 114a may enable operations that exceed or span such sizes, times, or the like.

Figure 7:
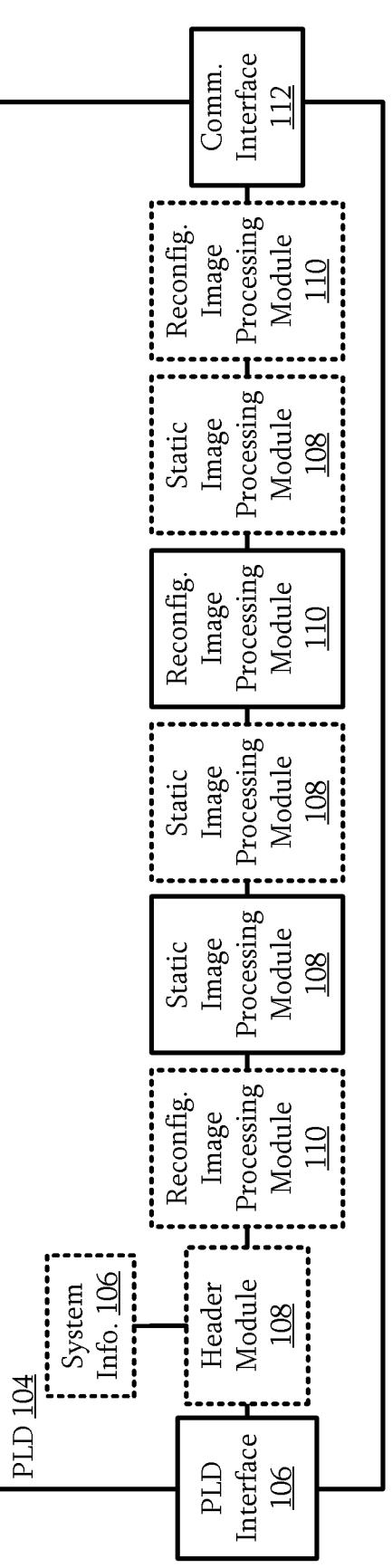
FIG. 7 is a block diagram of an x-ray imaging device with a programmable logic device including one or more reconfigurable image processing module s according to some embodiments.

FIG. 7 is a block diagram of an x-ray imaging device with a programmable logic device including one or more reconfigurable image processing modules according to some embodiments. The programmable logic device 104 may be similar to the programmable logic device 104 described above with respect to FIGS. 1-6. In some embodiments, the programmable logic device 104 may include one or more static image processing modules 108 and one or more reconfigurable image processing modules 110 as part of the image processing pipeline when the programmable logic device 104 is configured with the static configuration data 116. One or more of the reconfigurable image processing modules 110 may be reconfigured with associated dynamic configuration data 118. The static image processing modules 108 and the reconfigurable image processing modules 110 may be in any order within the image processing pipeline.

In some embodiments, less than all of the reconfigurable image processing module 110 may be reconfigured with dynamic configuration data 118. For example, a user may apply one set of dynamic configuration data 118 that reconfigures two reconfigurable image processing modules 110 that are downstream (in a processing direction towards the communication interface 112) of and static image processing module 108. However, other upstream reconfigurable image processing modules 110 may not be reconfigured. Those upstream reconfigurable image processing modules 110 may remain configured as passthrough image processing modules 110a as described above. At a later time, the reconfigurable image processing module 110 may be reconfigured so that some of the downstream reconfigurable image processing modules 110 are configured as passthrough image processing modules 110a while other reconfigurable image processing modules 110 are configured for different operations. While the terms upstream and downstream have been used as examples of groups of reconfigurable image processing modules 110 that may or may not be reconfigured, in other embodiments, the grouping may be different and individual groups may contain only a single reconfigurable image processing module 110.

In some embodiments, the reconfigurable image processing module 110 may be reordered. For example, for a first set of dynamic configuration data 118, the reconfigurable image processing module 110 may be located in the image processing pipeline after the static image processing module 108. However, for a second set of dynamic configuration data 118, the reconfigurable image processing module 110 may be located in the image processing pipeline after the static image processing module 108. In some embodiments, the reordering may be achieved by replacing one reconfigurable image processing module 110 with a passthrough image processing module 110a and replacing different a reconfigurable image processing module 110 with the new configuration. In other embodiments, the reordering may be achieved by changing the routing of signals in the image processing pipeline.

FIG. 8 is a flowchart of a technique of operating an x-ray imaging device with a programmable logic device including a reconfigurable image processing module according to some embodiments. The x-ray imaging device 100 of FIG. 1 will be used as an example. Referring to FIGS. 1 and 8, in some embodiments, in 804 static configuration data 116 is applied to a programmable logic device 104. For example, the processor 126 may read the static configuration data 116 from the memory 114. The processor 126 may apply the static configuration data 116 to the programmable logic device 104 in a manner particular to the programmable logic device 104, such as through a Serial Peripheral Interface (SPI), Joint Test Action Group (JTAG) interface, or the like coupling programmable logic device 104 to the processor 126. When the programmable logic device 104 is configured with the static configuration data 116, the programmable logic device 104 is configured with a static image processing module 108 and a reconfigurable image processing module 110. At this point the reconfigurable image processing module 110 is configured as a passthrough image processing module 110a. That is, when configured with the static configuration data 116, the reconfigurable image processing module 110 is configured to receive image data and output the image data without modification.

In 808, dynamic configuration data 118 is applied to the programmable logic device 104 to replace the reconfigurable image processing module 110. For example, the processor 126 may read the dynamic configuration data 118 from the memory 114. The processor may then apply the dynamic configuration data 118 to the programmable logic device 104 in a manner similar to applying the static configuration data 116 in 804. As described above, the dynamic configuration data 118 does not include configuration data for the static image processing module 108.

The application of the dynamic configuration data 118 may be performed at a variety of times. In some embodiments, the the dynamic configuration data 118 may be applied at startup before the x-ray imaging device 100 and/or the image processing pipeline is activated. In other embodiments, the dynamic configuration data 118 may be applied while the x-ray imaging device 100 and/or the image processing pipeline is operating.

In some embodiments, the configuration of the programmable logic device 104 with the static configuration data may include one or more static image processing modules 108 and one or more reconfigurable image processing modules 110. The dynamic configuration data 118 may include one or more replacement reconfigurable image processing modules 110. The number and location of the reconfigurable image processing module 110 defined by the dynamic configuration data 118 may be the same or a smaller subset of the number and location of the reconfigurable image processing module 110. For example, the dynamic configuration data 118 may define three reconfigurable image processing module 110 while the static configuration data 116 defines four reconfigurable image processing module 110. When the dynamic configuration data 118 is applied in 808, the associated three reconfigurable image processing module 110 may be reconfigured while the remaining reconfigurable image processing module 110 remains in a passthrough configuration.

In 812, incident x-rays are converted into the electrical signals with a sensor array 102. The electrical signals may be digitized in the circuit 103 and input to the programmable logic device 104 through the array interface 106.

In 816, the electrical signals are processed with an image processing pipeline configured to receive electrical signals and output an image. The static image processing module 108 and the reconfigurable image processing module 110 are part of the image processing pipeline configured to receive the electrical signals and output an image.

In some embodiments, the static image processing module 108 is configured to perform at least one of offset correction, gain correction, scatter correction, grid suppression, defective pixel correction, or other modifications of the image data. These operations may be performed by a single static image processing module 108 or multiple static image processing modules 108.

Referring to FIGS. 1, 3, and 8, in some embodiments, the processing of the electrical signals with the image processing pipeline may include adding device information 132 to the image processing pipeline with a header module 130 of the image processing pipeline such that the device information 132 is available to the reconfigurable image processing module 110. Both the operations to obtain the device information 132 and the header module 130 may be defined by the static configuration data 116. Thus, when the static configuration data 116 is applied in 804, the header module 132 and the availability of the association device information 132 may be implemented in the programmable logic device 104. As described above, the device information 132 may include a variety of types of information. The various sources described with reference to FIG. 4 are examples of types of device information 132 that may be added to the image processing pipeline and be available to the reconfigurable image processing module 110.

FIG. 9 is a block diagram of an x-ray imaging system according to some embodiments. The x-ray imaging system 900 includes an x-ray source 902 and detector 910. The detector 910 may include an x-ray imaging device 100 or the like as described above. In some embodiments, the x-ray source 902 includes multiple field emitters (FE) 924. Electron beams from the field emitters 924 may be directed towards an anode 926 to generate x-rays 920. The x-ray source 902 is disposed relative to the detector 910 such that x-rays 920 may be generated to pass through a specimen 922 and detected by the detector 910. In some embodiments, the detector 910 is part of a medical imaging system. In other embodiments, the x-ray imaging system 900 may include a portable vehicle scanning system as part of a cargo scanning system. The system 900 may be any system that may include an x-ray detector.

Some embodiments include an x-ray imaging device 100, comprising: a sensor array 102 configured to convert incident x-rays into electrical signals; a memory 114 configured to store a static configuration data 116; a processor 126; a programmable logic device 104; and a communication interface 112; wherein: the processor 126 is configured to apply the static configuration data 116 to the programmable logic device 104; when configured with the static configuration data 116, the programmable logic device 104 is configured with: a static image processing module 108; and a reconfigurable image processing module 110; and the static image processing module 108 and the reconfigurable image processing module 110 are part of an image processing pipeline configured to receive the electrical signals and output an image.

In some embodiments, the reconfigurable image processing module 110 is configured to receive image data and output the image data without modification.

In some embodiments, the static image processing module 108 is configured to perform at least one of offset correction, gain correction, scatter correction, grid suppression, and defective pixel correction.

In some embodiments, the processor 126 is configured to: read dynamic configuration data 118 from the memory 114; and reconfigure the programmable logic device 104 with the dynamic configuration data 118 to replace the reconfigurable image processing module 110; and the dynamic configuration data 118 does not include configuration data for the static image processing module 108.

In some embodiments, the dynamic configuration data 118 is first dynamic configuration data 118; and the processor 126 is configured to: read second dynamic configuration data 118 from the memory 114; and reconfigure the programmable logic device 104 with the second dynamic configuration data 118 to replace the reconfigurable image processing module 110 previously configured by the first dynamic configuration data 118.

In some embodiments, when configured with the static configuration data 116, the programmable logic device 104 is configured with a header module 130; and the header module 130 is part of the image processing pipeline and is configured to add device information to the image processing pipeline such that the device information is available to the reconfigurable image processing module 110.

In some embodiments, the x-ray imaging device 100 further comprises a temperature sensor 120; wherein: the header module 130 is configured to add temperature information to the image processing pipeline in response to the temperature sensor; and the temperature information is available to the reconfigurable image processing module 110.

In some embodiments, the x-ray imaging device 100 further comprises random access memory 114 (RAM) coupled to the programmable logic device 104; wherein when the programmable logic device 104 is configured with the static configuration data 116, the random access memory 114 is accessible to the reconfigurable image processing module 110.

In some embodiments, when configured with the static configuration data 116, the programmable logic device 104 is configured with a plurality of reconfigurable image processing modules 110; and the static image processing module 108 and the reconfigurable image processing modules 110 are part of the image processing pipeline.

In some embodiments, the processor 126 is configured to: read dynamic configuration data 118 from the memory 114; and reconfigure the programmable logic device 104 with the dynamic configuration data 118 to replace at least some of the reconfigurable image processing module 110; and the dynamic configuration data 118 includes configuration data for less than all of the reconfigurable image processing modules 110.

Some embodiments include a method, comprising: applying static configuration data 116 to a programmable logic device 104, wherein: when configured with the static configuration data 116, the programmable logic device 104 is configured with: a static image processing module 108; and a reconfigurable image processing module 110; applying dynamic configuration data 118 to the programmable logic device 104 to replace the reconfigurable image processing module 110; converting incident x-rays into electrical signals with a sensor array 102; processing the electrical signals with an image processing pipeline configured to receive electrical signals and output an image; and wherein: the static image processing module 108 and the reconfigurable image processing module 110 are part of the image processing pipeline configured to receive the electrical signals and output an image; and the dynamic configuration data 118 does not include configuration data for the static image processing module 108.

In some embodiments, when configured with the static configuration data 116, the reconfigurable image processing module 110 is configured to receive image data and output the image data without modification.

In some embodiments, the static image processing module 108 is configured to perform at least one of offset correction, gain correction, scatter correction, grid suppression, and defective pixel correction.

In some embodiments, the method further comprises applying the dynamic configuration data 118 to the programmable logic device 104 to reconfigure the reconfigurable image processing module 110 while operating.

In some embodiments, applying the dynamic configuration data 118 to the programmable logic device 104 to reconfigure the reconfigurable image processing module 110 comprises reordering the reconfigurable image processing module 110.

In some embodiments, the method further comprises adding device information to the image processing pipeline with a header module 130 of the image processing pipeline such that the device information is available to the reconfigurable image processing module 110.

In some embodiments, the device information includes temperature information associated with the sensor array 102; and the temperature information is part of the device information available to the reconfigurable image processing module 110.

In some embodiments, when configured with the static configuration data 116, the programmable logic device 104 is configured with a plurality of reconfigurable image processing modules 110; and the static image processing module 108 and the reconfigurable image processing modules 110 are part of the image processing pipeline.

In some embodiments, applying the dynamic configuration data 118 to the programmable logic device 104 comprises replacing less than all of the reconfigurable image processing modules 110.

Some embodiments include an x-ray imaging device, comprising: means for applying static configuration data to a programmable logic device, wherein: when configured with the static configuration data, the programmable logic device is configured with: a static image processing module; and a reconfigurable image processing module; means for applying dynamic configuration data to the programmable logic device to replace the reconfigurable image processing module; means for converting incident x-rays into electrical signals with a sensor array; means for processing the electrical signals with an image processing pipeline configured to receive electrical signals and output an image; and wherein: the static image processing module and the reconfigurable image processing module are part of the image processing pipeline configured to receive the electrical signals and output an image; and the dynamic configuration data does not include configuration data for the static image processing module.

Examples of the means for applying static configuration data to a programmable logic device include the processor 126 and memory 114 or the like.

Examples of the means for applying dynamic configuration data to the programmable logic device to replace the reconfigurable image processing module include the processor 126 and memory 114 or the like.

Examples of the means for converting incident x-rays into electrical signals include the sensor array 102 or the like.

Examples of the means for processing the electrical signals with an image processing pipeline configured to receive electrical signals and output an image include the programmable logic device 104 when configured with the static configuration data and optionally the dynamic configuration data.

In some embodiments, the x-ray imaging device further comprises means for adding device information to the image processing pipeline such that the device information is available to the reconfigurable image processing module. Examples of the means for adding device information to the image processing pipeline include the header module 130 or the like.

Although the structures, devices, methods, and systems have been described in accordance with particular embodiments, one of ordinary skill in the art will readily recognize that many variations to the particular embodiments are possible, and any variations should therefore be considered to be within the spirit and scope disclosed herein. Accordingly, many modifications may be made by one of ordinary skill in the art without departing from the spirit and scope of the appended claims.

The claims following this written disclosure are hereby expressly incorporated into the present written disclosure, with each claim standing on its own as a separate embodiment. This disclosure includes all permutations of the independent claims with their dependent claims. Moreover, additional embodiments capable of derivation from the independent and dependent claims that follow are also expressly incorporated into the present written description. These additional embodiments are determined by replacing the dependency of a given dependent claim with the phrase "any of the claims beginning with claim [x] and ending with the claim that immediately precedes this one," where the bracketed term "[x]" is replaced with the number of the most recently recited independent claim. For example, for the first claim set that begins with independent claim 1, claim 4 can depend from either of claims 1 and 3, with these separate dependencies yielding two distinct embodiments; claim 5 can depend from any one of claim 1, 3, or 4, with these separate dependencies yielding three distinct embodiments; claim 6 can depend from any one of claim 1, 3, 4, or 5, with these separate dependencies yielding four distinct embodiments; and so on.

Recitation in the claims of the term "first" with respect to a feature or element does not necessarily imply the existence of a second or additional such feature or element. Elements specifically recited in means-plus-function format, if any, are intended to be construed to cover the corresponding structure, material, or acts described herein and equivalents thereof in accordance with 35 U.S.C. § 112 (f). Embodiments of the invention in which an exclusive property or privilege is claimed are defined as follows.

The invention claimed is:

1. An x-ray imaging device, comprising:
  a sensor array configured to convert incident x-rays into electrical signals;
  a memory configured to store a static configuration data;
  a processor;
  a programmable logic device; and
  a communication interface;
  wherein:
    the processor is configured to apply the static configuration data to the programmable logic device;

when configured with the static configuration data, the
   programmable logic device is configured with:
   static image processing logic; and
   reconfigurable image processing logic; and
   the static image processing logic and the reconfigurable
     image processing logic are part of an image process-
     ing pipeline configured to receive the electrical sig-
     nals and output an image.

2. The x-ray imaging device of claim 1, wherein:
the reconfigurable image processing logic is configured to
   receive image data and output the image data without
   modification.

3. The x-ray imaging device of claim 1, wherein:
the static image processing logic is configured to perform
   at least one of offset correction, gain correction, scatter
   correction, grid suppression, and defective pixel cor-
   rection.

4. The x-ray imaging device of claim 1, wherein:
the processor is configured to:
   read dynamic configuration data from the memory; and
   reconfigure the programmable logic device with the
     dynamic configuration data to replace the reconfig-
     urable image processing logic; and
   the dynamic configuration data does not include configu-
     ration data for the static image processing logic.

5. The x-ray imaging device of claim 4, wherein:
the dynamic configuration data is first dynamic configu-
   ration data; and
the processor is configured to:
   read second dynamic configuration data from the
     memory; and
   reconfigure the programmable logic device with the
     second dynamic configuration data to replace the
     reconfigurable image processing logic previously
     configured by the first dynamic configuration data.

6. The x-ray imaging device of claim 1, wherein:
when configured with the static configuration data, the
   programmable logic device is configured with header
   logic; and
the header logic is part of the image processing pipeline
   and is configured to add device information to the
   image processing pipeline such that the device infor-
   mation is available to the reconfigurable image pro-
   cessing logic.

7. The x-ray imaging device of claim 6, further compris-
ing:
a temperature sensor;
wherein:
   the header logic is configured to add temperature
     information to the image processing pipeline in
     response to the temperature sensor; and
   the temperature information is available to the recon-
     figurable image processing logic.

8. The x-ray imaging device of claim 1, further compris-
ing:
random access memory, RAM, coupled to the program-
   mable logic device;
wherein when the programmable logic device is config-
   ured with the static configuration data, the random
   access memory is accessible to the reconfigurable
   image processing logic.

9. The x-ray imaging device of claim 1, wherein:
when configured with the static configuration data, the
   programmable logic device is configured with a plu-
   rality of reconfigurable image processing logics; and the static image processing logic and the reconfigurable
   image processing logics are part of the image process-
   ing pipeline.

10. The x-ray imaging device of claim 9, wherein:
the processor is configured to:
   read dynamic configuration data from the memory; and
   reconfigure the programmable logic device with the
     dynamic configuration data to replace at least some
     of the reconfigurable image processing logics; and
the dynamic configuration data includes configuration
   data for less than all of the reconfigurable image
   processing logics.

11. A method, comprising:
applying static configuration data to a programmable
   logic device, wherein:
   when configured with the static configuration data, the
     programmable logic device is configured with:
     a set of static image processing operations; and
     a set of reconfigurable image processing operations;
applying dynamic configuration data to the programmable
   logic device to replace the set of reconfigurable image
   processing operations;
converting incident x-rays into electrical signals with a
   sensor array;
processing the electrical signals with an image processing
   pipeline configured to receive the electrical signals and
   output an image; and
wherein:
   the set of static image processing operations and the set
     of reconfigurable image processing operations are
     part of the image processing pipeline configured to
     receive the electrical signals and output the image;
     and
   the dynamic configuration data does not include the
     static configuration data for the set of static image
     processing operations.

12. The method of claim 11, wherein:
when configured with the static configuration data, the set
   of reconfigurable image processing operations is con-
   figured to receive image data and output the image data
   without modification.

13. The method of claim 11, wherein:
the set of static image processing operations is configured
   to perform at least one of offset correction, gain cor-
   rection, scatter correction, grid suppression, and defec-
   tive pixel correction.

14. The method of claim 11, further comprising:
applying the dynamic configuration data to the program-
   mable logic device to reconfigure the set of reconfig-
   urable image processing operations while operating.

15. The method of claim 11, wherein:
applying the dynamic configuration data to the program-
   mable logic device to reconfigure the set of reconfig-
   urable image processing operations comprises reorder-
   ing the set of reconfigurable image processing
   operations.

16. The method of claim 11, further comprising:
adding device information to the image processing pipe-
   line with a set of header generating operations of the
   image processing pipeline such that the device infor-
   mation is available to the set of reconfigurable image
   processing operations.

17. The method of claim 11, wherein:
when configured with the static configuration data, the
   programmable logic device is configured with a plu-
   rality of sets of reconfigurable image processing opera-
   tions; and the set of static image processing operations and the sets of reconfigurable image processing operations are part of the image processing pipeline.

18. The method of claim 17, wherein:

applying the dynamic configuration data to the programmable logic device comprises replacing less than all of the sets of reconfigurable image processing operations.

19. An x-ray imaging device, comprising:

a processor;

memory including instructions thereon that, when accessed by the processor, cause the processor to:

apply static configuration data to a programmable logic device, wherein:

when configured with the static configuration data, the programmable logic device is configured with:

static logic; and reconfigurable logic; and apply dynamic configuration data to the programmable logic device to replace the reconfigurable logic;

a sensor array for converting incident x-rays into electrical signals; and the programmable logic device is configured to process the electrical signals with an image processing pipeline configured to receive the electrical signals and output an image;

wherein:

the static logic and the reconfigurable logic are part of the image processing pipeline configured to receive the electrical signals and output the image; and the dynamic configuration data does not include the static configuration data for the static logic.

20. The x-ray imaging device of claim 19, wherein, when configured with the static configuration data, the programmable logic device is further configured with:

header logic for adding device information to the image processing pipeline such that the device information is available to the reconfigurable logic.

\* \* \* \* \*